United States Patent [19]

Schrör et al.

[11] 4,312,704
[45] Jan. 26, 1982

[54] SHUT-OFF DEVICE BLOCKING SPONTANEOUS PASSAGE OF SPHERICAL BULK MATERIAL ESPECIALLY IN QUICK EMPTYING PIPES OF PEBBLE BED REACTORS

[75] Inventors: Horst Schrör, Moers; Gert-Michael Spindler, Jülich, both of Fed. Rep. of Germany

[73] Assignee: Kernforschungsanlage Jülich Gesellschaft mit beschrankter Haftung, Jülich, Fed. Rep. of Germany

[21] Appl. No.: 34,259

[22] Filed: Apr. 30, 1979

[51] Int. Cl.³ .............................. G21C 3/56; P03C 9/00
[52] U.S. Cl. .................................... 376/265; 138/94.3; 376/266; 376/381
[58] Field of Search ................... 176/19 R, 58 PB, 30; 89/1.5; 138/94.3, 41

[56] References Cited

U.S. PATENT DOCUMENTS

| | | | |
|---|---|---|---|
| 401,851 | 4/1889 | Parsons | 89/1.5 R |
| 953,739 | 4/1910 | Duncombe | 89/1.5 R |
| 1,000,173 | 8/1911 | Hughes | 138/94.3 |
| 1,112,066 | 9/1914 | Hollis | 138/94.3 |
| 2,812,303 | 11/1957 | Daniels | 176/37 |
| 3,034,689 | 5/1962 | Stoughton et al. | 176/58 PB |
| 3,142,625 | 7/1964 | Wellborn | 176/19 R |
| 3,253,738 | 5/1966 | Bromley | 176/58 PB |
| 3,830,693 | 8/1974 | Beser et al. | 176/58 PB |
| 3,855,058 | 12/1974 | Groos et al. | 176/58 PB |
| 4,007,911 | 2/1977 | Clarkson | 138/94.3 |
| 4,088,155 | 5/1978 | Echtler | 138/41 |

OTHER PUBLICATIONS

Nuc. Appl. & Tech., vol. 7, No. 4 (10/69), pp. 334–341, Hennings, S 0086 0029.

*Primary Examiner*—Sal Cangialosi
*Attorney, Agent, or Firm*—Frishauf, Holtz, Goodman & Woodward

[57] ABSTRACT

Grill gates respectively formed by oppositely moving, interfitting rod combs with gaps between the rods which are smaller than the particle diameter are so arranged so that each comb may be individually moved to the open position and shut again without allowing any of the even sized particles of the bulk material to pass through the other comb while testing the readiness of the comb operating system. Grooves of circular arc cross-section fitting the size of the spheres of a high-temperature reactor are provided in the upstream sides of the wall produced by the interfitting combs to enable close packing of the spheres against the closure wall in an ordered arrangement that allows either comb to be withdrawn and reinserted without breakage of the spherical elements. The grooves are oriented in the length dimension of the comb rods, and one set of comb rods provides the groove bottoms and the adjoining rods of the other set the cooperating groove flanks. The outer rods of one of the combs carries a more or less semi-circular plate fitting the conduit wall through which plate slots are provided for passage of the rods of the other comb.

20 Claims, 13 Drawing Figures

SHUT-OFF DEVICE BLOCKING SPONTANEOUS PASSAGE OF SPHERICAL BULK MATERIAL ESPECIALLY IN QUICK EMPTYING PIPES OF PEBBLE BED REACTORS

The invention concerns a shut-off device for tubular conduits, particularly for the downwards-leading quick core emptying of nuclear reactors of the bulk type, especially the pebble bed reactor type, designed for spontaneous discharge of the fuel elements when the conduit is not shut off.

In the operation of nuclear reactors, it is extremely important to assure the afterheat removal in the case of a failure of reactor cooling. Therefore, high-temperature reactors utilizing spherical fuel elements (like in pebble bed reactors) are provided with a quick core-discharge system to prevent excessive core heating in the case of a failure of all available apparatus for removal of heat developed in the core. Such systems lead the spherical fuel elements in such an emergency to emptying conduits that are distributed around the periphery of the core bottom, inclined downwards, and running generally radially, leading the fuel elements out of the core into a cooled reception cavity which may particularly be a ring chamber surrounded by water and located at a level beneath that of the core.

These emptying conduits could even lead perpendicularly downward, but they are preferably inclined about 30° to the horizontal and usually branch out from the conventional fuel element extracting conduits of the core.

In such quick spontaneous core discharge systems, the mechanical shut-off devices that are located in the downward leading discharge conduits must be sure to function. Repeated testing of their function in every case under full load is, therefore, required without producing a substantial discharge or emptying of the reactor core and without resulting in a noticable modification of the original condition of the shut-off device in question.

These requirements are not met from a practical standpoint by the known shut-off devices.

In process engineering technology, cut-off devices such as diaphragms, insertion discs, flaps, and rupture-type safety discs operated by levers are known. These are either are not capable of, or accessible for, repeated testing (rupture discs) or are insufficient even in a combination of several similar devices, one behind the other, for effectively providing repeated functional testing without appreciable modification of the original condition as above mentioned. If the first shut-off device directly adjacent to the core is opened, a substantial volume of fuel elements drops into the space between the first and second shut-off device of a series of successive gate discs or blocking flaps, as the result of which a precise closing of the open first shut-off device is either completely prevented or is possible only at the price of a higher rate of breakage of the spherical fuel elements.

On the otherhand, elimination of the quantities of fuel elements getting into the region between the shut-off devices in functional testing produces difficulties.

It is an object of this invention to develop a new shut-off device to avoid the difficulties described, which will permit repeated functional testing, without resulting in an appreciable modification of the initial state and without compromising or making doubtful, by a modification of the system, the readiness condition established as a result of the functional test.

SUMMARY OF THE INVENTION

Briefly, two interfitting rod combs, each movable into the conduit cross-section, are individually actuatable and combine to form a load-bearing wall running transversely across the conduit and the gap between the individual rods of each set of comb rods (which rods may be constituted either as solid or as hollow rods of suitable cross-section) is smaller than the diameter of the fuel elements (balls).

Preferably, the respective sets of rods of the two interfitting combs or grids combine to form a load-bearing wall with ball-fitting grooves on the upstream side of this gate wall, running in a direction aligned with the rods, with the bottom portion of each groove being formed by the upstream face of a rod of one of the combs and the side portions of the groove being completed in adjoining portions of the two rods adjacent on either side and belonging to the other of the combs.

Preferably, a symmetrical forming of the ball-fitting grooves is provided by correspondingly formed longitudinal sides of the rods.

Apart from the difference in the cross-sectional shape of the rods of the respective combs necessary to provide the grooves, the interfitting rods of the two combs could have basically similar configurations. A particularly favorable arrangement mechanically is obtained by approximately I-shaped cross-sections of the rods of the first comb which provide the bottoms of the ball-fitting grooves, while the complementary cross-sectional shapes of the rods of the second comb fitting in between are provided by hollow rods, as further described below with reference to FIG. 3. In this preferred configuration, the width of the rods of both combs, as particularly seen on the (downstream) side of the structure opposite the side with the ball grooves, is substantially equal.

The ball grooves formed by the cooperation of the rods of the two combs of the shut-off device prevent a change of position of the balls, which are fuel element balls of uniform diameter, upon the operation of one or the other of the combs, particularly if care is taken upon the initial complete loading of the system, to pack the first three layers of balls adjoining the shut-off device as closely and as free of voids as possible. It can, accordingly, be useful to pack these first layers of balls by hand, but even if that is not done, the spontaneous ordered arrangement of the balls is favored by the grooves and, also, by a cooperating profiling of the rods of the second comb, so that the connecting surfaces between the surfaces forming the edges of the ball grooves is, preferably, roof-shaped. Furthermore, the ordered gapless ball filling in the region of the conduit adjacent to the shut-off device can be aided by a shaping of the joining conduit wall section on the "upstream" side of the combs, which shaping should favor the gapless filling of each of the grooves with fuel balls.

By means of the present invention, it is basically possible to perform repeated functional tests of the shut-off device by successively opening and again closing the first and then the second of the combs. The direction of the rods has practically no special significance in this connection. If one proceeds, however on the basis that the system should remain unimpairedly capable of operation even after a serious accident that previously has been only simulated, without requiring any entry from outside, it is useful to have the generally I-shaped rods of the first comb arranged to be movable from above downwards and the complementary rods of the second comb from below upwards to reach their interfitting closed positions.

In this manner the opening up of the comb rod guideways can be prevented so that the balls could fall into them when the shut-off device is opened. This is particularly so if the rod lengths and the closed-off end surfaces of the rods of the second comb are so constituted that when the second comb is moved downward into its open position, a flush closing of the guideways in the conduit walls is provided.

Furthermore, in order to prevent the possibility that balls could be pressed upwards into corresponding holes, the second comb preferably includes a slotted cover plate of half-ring-shaped configuration so that it is complementary to the inner conduit wall, as is further show, for example, in FIG. 5.

The approximately I-shaped rods of the first comb that is moved down from above into its closed position preferably have at their free ends extensions that engage, in the closed position, into corresponding cavities in the duct wall. In this manner, a supplementary supporting of the I-shaped rod is obtained which raises the load-bearing ability of the rods with respect to the column of balls lying against them. Upon opening this first comb, it is moved so far upward that these extensions no longer project into the duct cross-section.

The above-described oppositely directed movements of each of the combs and the closing off of the passages can be readily constituted mechanically if the connecting webs or bridges of the combs are offset from the closure plane, which can be provided by having the rods of the two combs fastened by extensions projecting away at right angles to the closure plane over to the connecting webs or bridges.

Hydraulic, pneumatic, or electrically operating systems can be provided that work by means of pistons, spindles, or other mechanical drives for the separate actuation of the individual rod combs. A spindle drive is particularly suitable in which the connecting bridges of the combs are guided, for example, by four roller bearings on corresponding rails that run in the direction of movement of the combs and are mounted laterally with respect to the tubular conduit, or else, in particular, are fastened to the inside of a pressure container that serves as a supporting construction.

The entire shut-off equipment is enclosed in a double pressure container with pressure-tight spindle guides leading thereto. Within the emptying or discharge duct, three gas-blocking valves, particularly in the form of wedge valves are connected to the spindle guides.

BRIEF DESCRIPTION OF THE DRAWINGS

The invention is further described by way of illustrative example with reference to the annexed drawings, in which.

DESCRIPTION OF A PREFERRED ILLUSTRATIVE EMBODIMENT

Figure 1:
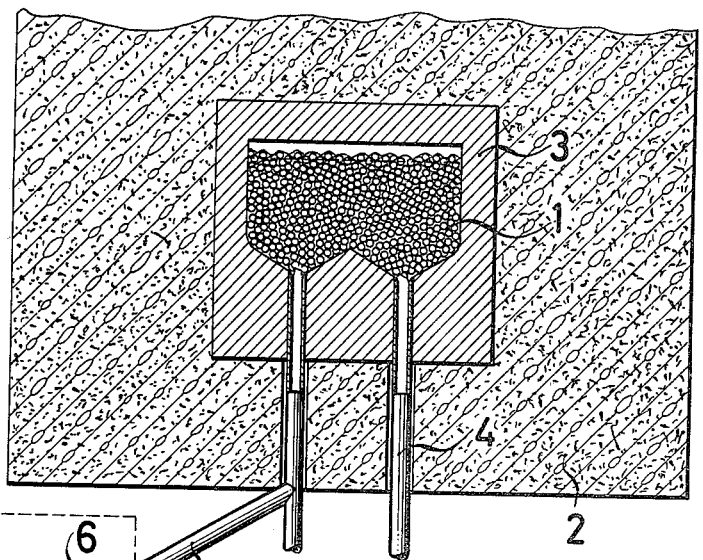
FIG. 1 is a basic diagram of the construction of a quick discharge system for fuel elements of a pebble bed reactor.
Figure 1:
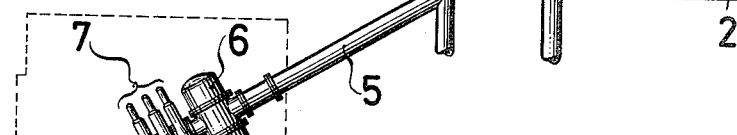
Figure 1:
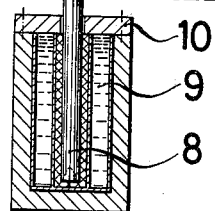

As shown in FIG. 1, a pebble bed 1 within an inner core structure 3, surrounded by a pre-stressed concrete pressure vessel 2 is unloaded in normal operation by discharge conduits 4 distributed around a circle at the core bottom. From the conduits 4, there branch off quick core-emptying ducts 5 that run obliquely and generally radially downward and outward, preferably at an angle of 30° to the horizontal. In the case of an accident, the shut-off device 6 is opened, after release of pressure, by means of the valve combination 7, and the spherical fuel elements from the charge 1 of the core fall into a ring cavity 8 that is surrounded by a water jacket 9 that is closed above by covers 10.

Figure 2:
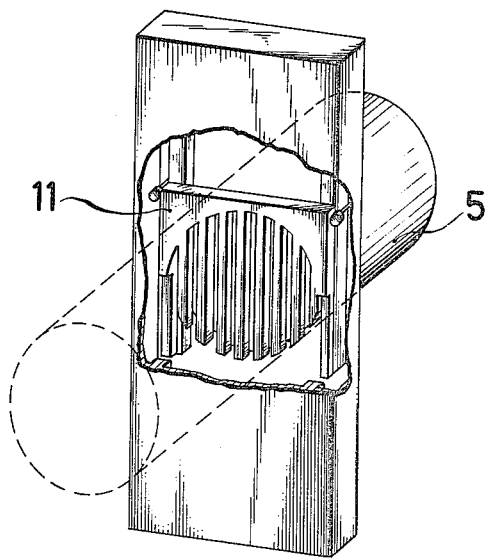
FIG. 2 is a diagram of the arrangement of a comb in the emptying conduit of the quick emptying system of FIG. 1.
Figure 3:
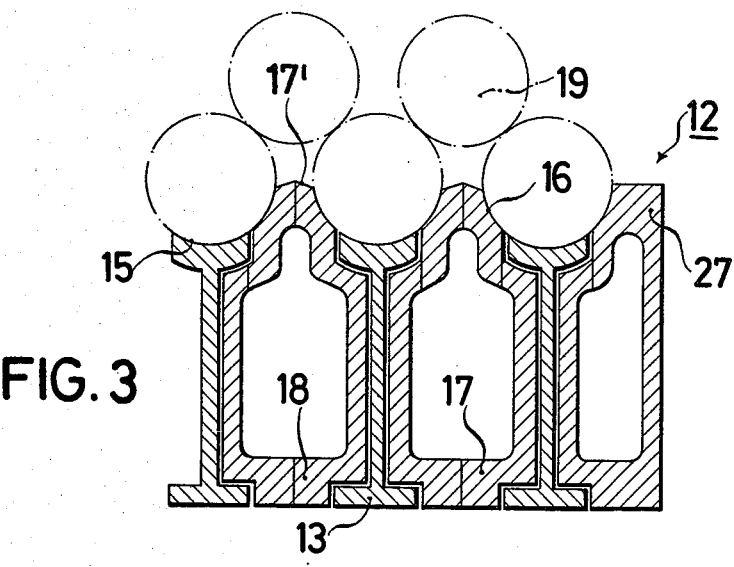
FIG. 3 is a cross-section through a part of the interfitting rods of a shut-off gate formed by them.

According to the invention, the shut-off device is formed from two interfitting rod combs that are arranged and caused to move perpendicularly to the conduit axis, of which one comb 11 is diagrammatically illustrated in FIG. 2. In accordance with a particularly preferred embodiment of the invention, the wall shutting off the conduit cross-section formed by the interfitting rods of the two combs is made up of rods of specially shaped cross-section as illustrated in FIG. 3. In that figure are shown the rods 13 of the comb 14 (see, also, FIG. 4), that are removed from above into the conduit cross-section.

These rods have an approximately I-shaped cross-section and form with their sides 15 that are turned towards the column of balls 19 lying against them (i.e., normally all the way to the core), the bottoms of ball grooves, of which the sides 16 are formed respectively by the two adjacent rods 17 of the comb 18 (see, also, FIG. 5), that is arranged to be driven into the conduit cross-section upward from below. The rods 17 are hollow and their connecting surfaces 17' between the surfaces 16 that form the edges or flanks of the ball grooves, have a generally roof-shaped configuration, so that the spontaneous ordering of the spheres 19 in the ball grooves 15 and 16 is promoted thereby.

As shown in FIGS. 4 and 5, the rods movable into the conduit cross-section respectively as part of the comb 14 and the comb 18 are held together respectively by connecting bridges 20 and 21, and are disposed outside of the closure wall plane and are each separately actuatable by spindle drives 22 and 23, respectively. For the seating of the connecting bridges 20 and 21, there are provided rails 24,25 along which the combs can ride on roller bearings 24' and 25'.

Figures 4A, 4C:
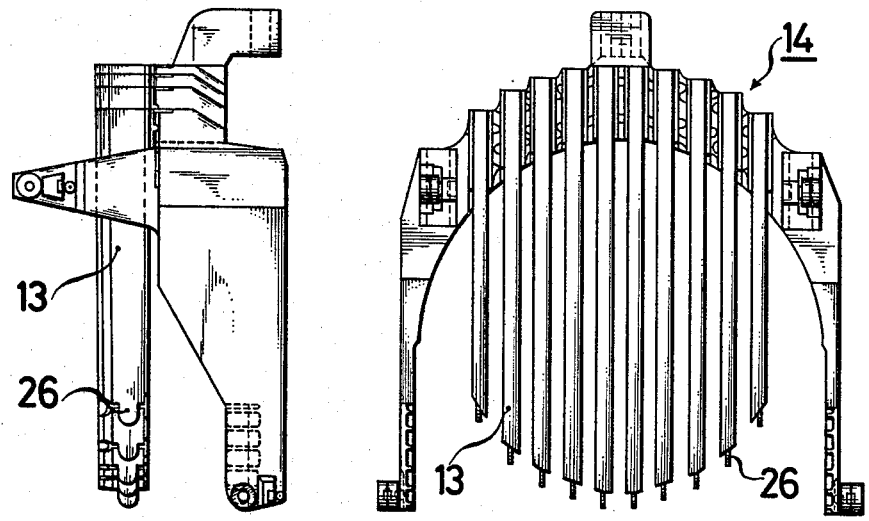
FIG. 4a shows in the axial direction, FIG. 4b in top view and FIG. 4c in side elevation the construction of one shut-off comb having rods of I-shaped cross-section.
Figure 4B:
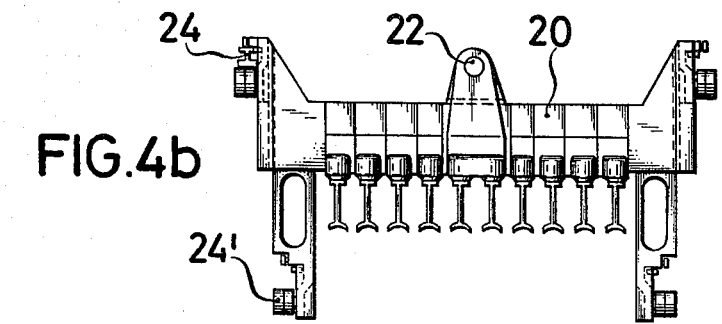
Figure 5C:
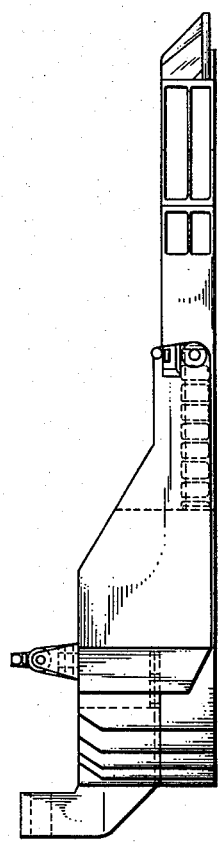
FIG. 5a shows in axial direction, FIG. 5b in top view, and FIG. 5c in side elevation, the construction of a shut-off comb having hollow rods that are moved upwards into closed position from below.
Figure 5A:
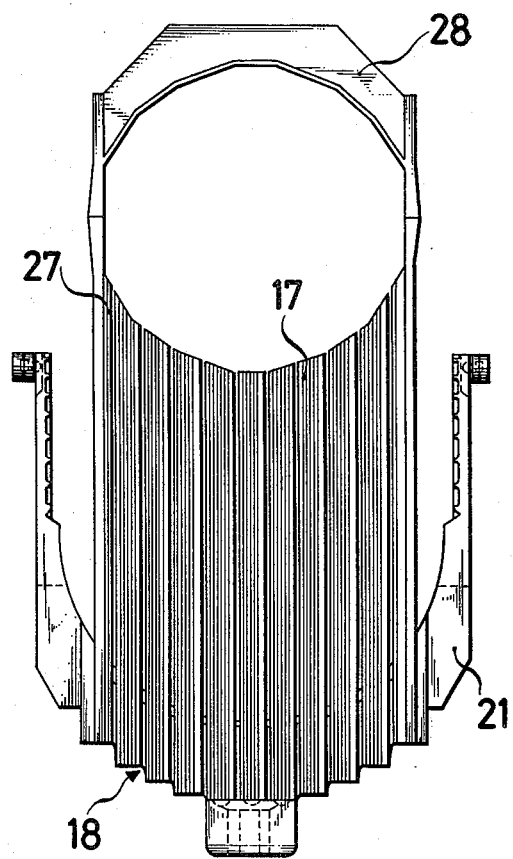
Figure 5B:
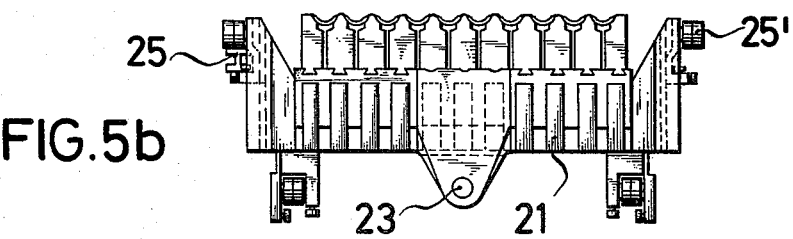
Figure 6A:
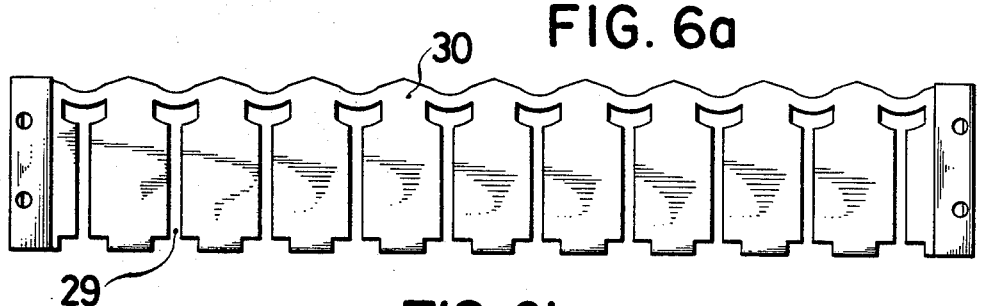
FIG. 6a shows in top view, and FIG. 6b in axial direction of the conduit, a slotted cover plate of the lower comb for complementing the conduit wall when the shut-off device is open.
Figure 6B:
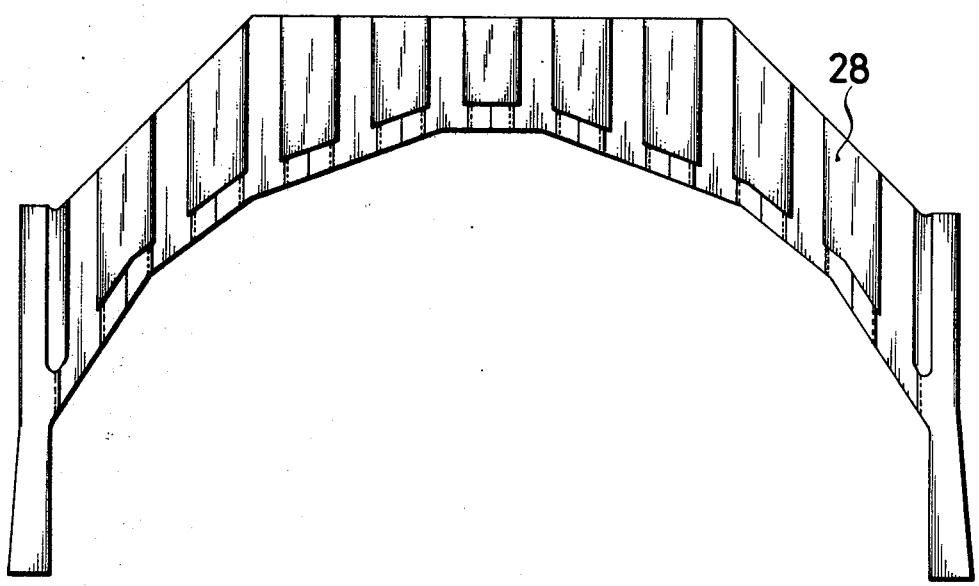

As shown in FIGS. 4a, 4b, and 4c, the rods 13 are prolonged by extensions 26 that fit into corresponding cavities in the lower conduit wall in the closed position of the comb. The correspondingly tapered and closed off ends of the rods 17 of the comb 18 that is movable upwards into the conduit cross-section from below complete the lower duct wall, as is shown in FIGS. 5a, 5b, and 5c, in the open position. The outer rods 27 of this comb 18 carry a slotted cover plate 28 that fills in the upper duct wall and is shown in more detail in FIGS. 6a and 6b.

The slotted cover plate 28 has slots 29 corresponding to the cross-section of the rods 13 and is held together by a connecting surface 30 extending above the slots. The surface 30 can be retracted by the thickness of the discharge conduit 5 so that the underside of the slotted cover plate 28 can be flush with the inside wall of the conduit, or else the surface 30 is so narrow that the broadening of the semicircular cut-out of the upper conduit surface beyond the shut-off wall cross-section in order to fit in the connecting surface 30 leaves only a narrow peripheral slit open, through which none of the balls can pass.

Figure 7:
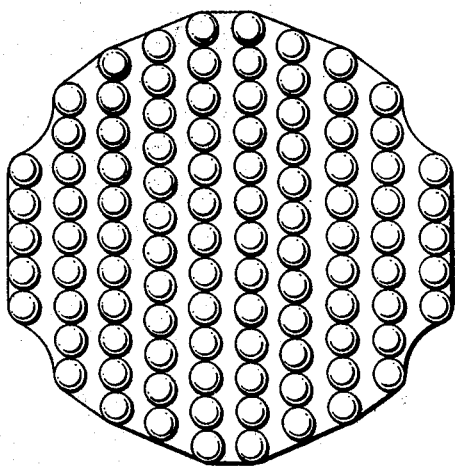
FIG. 7 is a front view of the first layer of spheres adjacent to the shut-off comb.

FIG. 7 shows the arrangement of the first layer of balls with all the ball grooves filled with an integral number of balls that are limited endwise by a corresponding curtaining or profiling of the inner conduit wall, so as to promote a dense and ordered packed seating of the fuel element balls adjacent to the shut-off device.

Figure 8:
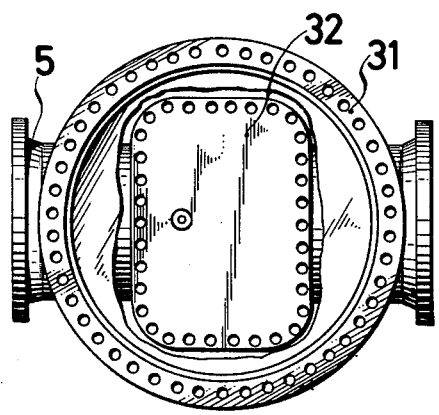
FIG. 8 is a diagrammatic illustration of the interfitting arrangement of unloading tubes together with inner and outer container fittings for passage of the conduit therethrough.

FIG. 8, finally, shows the spatial configuration of the cooperating double pressure vessels which enclose the entire installation made of the interfitting combs of the shut-off device, and are connected by flanges to the quick-emptying conduit 5. An outer casing block 31, encloses an inner casing block 32 that takes up the individual movable parts.

Although the invention has been described with reference to a particular illustrated embodiment, it will be understood that variations and modifications may be made within the inventive concept.

We claim:

1. A releasable shut-off device for a downward leading quick emptying conduit for bulk material in the form of solid particles having a predetermined minimum cross-sectional dimension, comprising:
a pair of interfitting rod combs (14,18) mounted so as to be individually movable in and out of the conduit cross-section, and equipped with structural means for moving the rods of the comb in unison, said combs being constituted and disposed so as to form, complementarily, a load-carrying wall perpendicular to the axis of said conduit in the closed position of said combs, the gaps between the rods (13,17) of each individual comb (14,18) having in every case a width less than said minimum cross-sectional dimension of said particles; and
means for individually actuating the rod-moving means of each of said combs (14,18), whereby the readiness of the device may be verified by moving each comb alone to its open position and back and whereby quick emptying of said container may be performed by moving both combs to their open positions.

2. A releasable shut-off device as defined in claim 1, in which the rods (13,17) of both combs (14,18) fit together to form a closed wall having grooves conforming in cross-section to the cross-section of said particles, which grooves run in the longitudinal direction of the rods, are provided on the upstream side of the shut-off device, and have their bottoms (15) in each case formed by the upstream sides of the rods (13) of a first one of said combs (14) and the flanks of which grooves are formed in each case by the two adjacent rods (17) of the second of said combs (18).

3. A releasable shut-off device as defined in claim 2, in which said rods (13) of said first comb (14) forming the groove bottoms (15) have a generally I-shaped cross-section (FIG. 3) and in which the respective widths of the rods (13,17) of said first comb (14) and of said second comb at the downstream side of said combs are substantially equal.

4. A releasable shut-off device as defined in claim 3, in which the rods (17) of said second comb (18) are hollow, and in which said rod-moving means of each comb include a cross-member outside said conduit, said cross-members of the respective combs being located on opposite sides of said conduit.

5. A releasable shut-off device as defined in claim 4, in which guide openings are provided in the conduit wall for the introduction of the rods of said second comb, in which device the ends of the rods (17) of said second comb (18) in the open position, as the result of different lengths and tapered ends, fill and close off said guide openings; in which device there is also provided a half-ring-shaped cover plate (28) connected to outer rods (27) of said second comb (18), said cover plate having slots (29) for the passage therethrough of the rods (13) of said first comb (14); and in which device the arrangement of rod ends and cover plate provides a largely closed duct wall half in the opposite wall region upon the opening of either of the combs of the shut-off device.

6. A releasable shut-off device as defined in claim 4, in which said first comb (14) is movable upwards out of its closed position and said second comb (18) is movable downwards into its open position.

7. A releasable shut-off device as defined in claim 4, in which the rods (13) of said first comb (14) are prolonged by small extension (26) and the opposite conduit wall is provided with corresponding cavities for receiving said extensions.

8. A releasable device as defined in any one of the preceding claims in which the rods (13,17) of comb combs (14,18) in the region of their external ends have extensions jutting at right angles out of the closure plane, which are affixed to connecting cross-members (20,21) of said rod combs (14,18), which cross-members are arranged to be driven parallel to said closure plane in a path spaced from said closure plane.

9. A releasable device as defined in any one of claims 1–7, in which each of said combs (14,18) is provided with a spindle drive (22,23) spaced to one side of the closure plane of said combs, each comb being provided with roller bearings and guide rails for guiding said combs (14,18) in the course of the closing and opening movements thereof.

10. A releasable device as defined in any one of claims 1–7, in which said shut-off device is enclosed by a double pressure container (31,32) enclosing the entire paired-comb closure system.

11. A releasable shut-off device as defined in claim 1 for a container which is a pebble bed nuclear reactor vessel in which the particles of bulk material for which the shut-off device provides quick-release capability are balls of reactor fuel which are of substantially uniform diameter.

12. A releasable shut-off device as defined in claim 11, in which the rods (13,17) of both combs (14,18) fit together to form a closed wall having grooves comforming in cross-section to the cross-section of said fuel balls, which grooves run in the longitudinal direction of the rods, are provided on the upstream side of the releasable shut-off device, and have their bottoms (15) in each case formed by the upstream sides of the rods (13) of the first of said combs (14) and the flanks of which grooves are formed in each case by the two adjacent rods (17) of the second of said combs (18).

13. A releasable shut-off device as defined in claim 12, in which said rods (13) of said first comb (14) forming the groove bottoms (15) have a generally I-shaped cross-section (FIG. 3) and in which the respective widths of the rods (13,17) of said first comb and of said second comb (18) at the downstream side of said combs are substantially equal.

14. A releasable shut-off device as defined in claim 13, in which the rods (17) of said second comb (18) are hollow.

15. A releasable shut-off device as defined in claim 14, in which the ends of the rods (17) of said second comb (18) has the result of different lengths and tapered ends, fill and close off in the open position the guide openings provided in the conduit wall for introduction of the rod, and there is also provided a half-ring-shaped cover plate (28) connected to the end rods (27) of said second comb (18), said cover plate having slots (29) for the passage therethrough of the rods (13) of said first comb (14), and in which device the arrangement of the rod ends (13) and cover plate provides a largely closed duct wall half in the opposite wall region upon the opening of either of the combs of the releasable shut-off device.

16. A releasable shut-off device as defined in claim 14, in which said first comb (14) is movable out of its closed position and said second comb (18) is movable downwards into it open position.

17. A releasable shut-off device as defined in claim 14, in which the rods (13) of said first comb are prolonged by small extensions (26) and the opposite conduit wall is provided with corresponding cavities for receiving said extensions.

18. A releasable shut-off device as defined in one of claims 11-17, in which the rods (13,17) of said combs (14,18) in the region of their external ends have extensions jutting at right angles out of the closure plane, which are affixed to connecting cross-members (20,21) of said rod combs (14,18), which cross-members are arranged to be driven parallel to said closure plane in a path spaced from said closure plane.

19. A releasable shut-off device as defined in one of claims 11-17, in which each of said combs (14,18) is provided with a spindle drive (22,23) spaced to one side of the closure plane of said combs, each comb being provided with roller bearings and guide rails for guiding said combs (14,18) in the course of the closing and opening movements thereof.

20. A releasable shut-off device as defined in one of claims 11-17, in which said shut-off device is enclosed by a double-pressure container (31,32) enclosing the entire paired comb closure system.

* * * * *